(12) United States Patent
Taysom

(10) Patent No.: US 8,452,823 B2
(45) Date of Patent: May 28, 2013

(54) METHOD FOR COORDINATING RELATIONSHIPS BETWEEN MULTIPLE PHYSICAL ENTITIES

(75) Inventor: Paul James Taysom, Provo, UT (US)

(73) Assignee: Novell, Inc., Provo, UT (US)

( * ) Notice: Subject to any disclaimer, the term of this patent is extended or adjusted under 35 U.S.C. 154(b) by 240 days.

(21) Appl. No.: 12/907,922

(22) Filed: Oct. 19, 2010

(65) Prior Publication Data

US 2011/0047194 A1   Feb. 24, 2011

Related U.S. Application Data

(62) Division of application No. 10/626,097, filed on Jul. 23, 2003, now Pat. No. 7,827,216.

(51) Int. Cl.
*G06F 12/00* (2006.01)
*G06F 17/30* (2006.01)

(52) U.S. Cl.
CPC .............................. *G06F 17/30067* (2013.01)
USPC ........................................................ 707/828

(58) Field of Classification Search
USPC ........................................................ 707/828
See application file for complete search history.

(56) References Cited

U.S. PATENT DOCUMENTS

| | | |
|---|---|---|
| 4,466,061 A | 8/1984 | DeSantis et al. |
| 4,468,736 A | 8/1984 | DeSantis et al. |
| 4,658,351 A | 4/1987 | Teng |
| 4,791,554 A | 12/1988 | Hirota et al. |
| 4,852,001 A | 7/1989 | Tsushima et al. |
| 4,980,824 A | 12/1990 | Tulpule et al. |
| 5,276,607 A | 1/1994 | Harris et al. |
| 5,295,065 A | 3/1994 | Chapman et al. |
| 5,325,525 A | 6/1994 | Shan et al. |
| 5,375,239 A | 12/1994 | Mortson |
| 5,381,545 A | 1/1995 | Baker et al. |
| 5,513,357 A | 4/1996 | Mortson |
| 5,535,383 A | 7/1996 | Gower |
| 5,604,908 A | 2/1997 | Mortson |
| 5,638,539 A | 6/1997 | Goti |
| 5,712,996 A | 1/1998 | Schepers |
| 5,787,439 A | 7/1998 | Taysom |
| 6,025,836 A | 2/2000 | McBride |
| 6,119,151 A | 9/2000 | Cantrell et al. |
| 2002/0091539 A1 | 7/2002 | Yin et al. |
| 2003/0065546 A1 | 4/2003 | Gorur et al. |
| 2003/0074090 A1 | 4/2003 | Becka et al. |

OTHER PUBLICATIONS

Lin, et al. On Transformation of Logic Specifications into Procedural Programs, IEEE, pp. 274-281, 1989.
Shieh, et al. Fine Grain Scheduler for Shared-Memory Multiprocessor Systems, IEEE, pp. 98-106, Mar. 1995.
Sakai, H., IEICE Trans. Inf. & Syst., vol. E76-D, No. 6, pp. 646-655, 1993.
Lyengar, A., IEEE, pp. 329-336, 1999.

(Continued)

*Primary Examiner* — Cheyne Ly
(74) *Attorney, Agent, or Firm* — Schwegman, Lundberg & Woessner, P.A.

(57) ABSTRACT

Two objects are identified. A relationship between the two objects is determined. A contract object is used to represent the relationship between the objects. The contract is useful in many applications: for example, file systems, relational databases, and spreadsheets. The contract can also have rules for processing events occurring to either of the objects related by the contract.

6 Claims, 15 Drawing Sheets

OTHER PUBLICATIONS

Kulkarni, D., Pi: A New Approach to Flexibility in System Software, Dissertation, Department of Computer Science and Engineering, Notre Dame, Indiana, Apr. 1995, pp. 1-146.

Alfred V. Aho, et al. "The Design and Analysis of Computer Algorithms" Ch. 5. Algorithms on Graphs, pp. 172-189, 1974.

Robert Sedgewick, "Algorithms" Second Edition Ch. 29. Elementary Graph Algorithms, pp. 415-435, 1988.

Ramakrishnan R., Database Management Systems, WCB/McGraw-Hill Companies, pp. 1, 6, 26-28, 359, 360, 361, 363, 365, 368, and 523, 1998.

Silberschatz A., ACM Computing Surveys, vol. 28, No. 4, pp. 764-778, Dec. 1996.

Snoeck, et al., Existence Dependency: The Key to Semantic Integrity Between Structure and Behavioral Aspects of Object Types by Snoeck and Dedene, IEEE Transactions on Software Engineering, vol. 24, No. 4, pp. 1-30 (Apr. 1998).

METHOD FOR COORDINATING RELATIONSHIPS BETWEEN MULTIPLE PHYSICAL ENTITIES

CROSS-REFERENCE TO RELATED APPLICATIONS

This application is a division of co-pending U.S. patent application Ser. No. 10/626,097 filed on Jul. 23, 2003, the disclosure of which is herein incorporated by reference.

FIELD OF THE INVENTION

This invention pertains to relating entities in a computer system, and more particularly to allowing each entity to manage its relationships.

BACKGROUND OF THE INVENTION

Many different file systems provide the capability of linking a file into more than one folder. For example, Unix® file systems provide for both hard and soft links. Use of either type of link lets a file in one directory be listed as though it were stored in the other directory as well. Similarly, the many flavors of the Microsoft® Windows® operating system offer shortcuts, which allow a user to access a file (or directory) from locations other than where the file is saved. (Unix is a registered trademark of the Open Group. Microsoft and Windows are registered trademarks of Microsoft Corporation in the United States and other countries.)

FIG. 1 shows an example of how links operate. In FIG. 1, there are two folders: folder 105 and folder 110. Folder 105 includes files 115 and link 120. Folder 110 includes files 125 and 130, and link 135. Link 120 points to file 125, making it appear that file 125 is also stored in folder 105. Link 135 points to file 115, making it appear that file 115 is also stored in folder 110.

There are other software environments, different from file systems, that can provide similar functionality. One such software environment, the relational database, offers users the ability to relate data in the database. For example, a business can track inventory received from suppliers in one table, and inventory sold in a second table, and cross-reference which suppliers supplied the inventory sold to particular customers. from suppliers in one table, and inventory sold in a second table, and cross-reference which suppliers supplied the inventory sold to particular customers.

Another software environment that allows users to cross-reference data is the spreadsheet. It is common for spreadsheets to have formulae that reference other cells. As the referenced cells change values, the cells with the formulae change automatically, reflecting the changes in the referenced cells. For example, if a cell has a formula that adds 5 to the value of a referenced cell, if the referenced cell changes from 5 to 10, the cell with the formula automatically changes from 10 to 15.

All three of these software environments share a common feature: one object (be it a directory, table, or cell) is referencing another object (file, table, or cell) stored elsewhere. And all three software environments share a similar problem. In all three software environments, there is no simple way for the referenced object (file, table, or cell) to determine what might be referencing the object. If the referenced file is changed, there is no way to determine which directories are affected by the change. If the referenced table is changed, there is no way to determine what other data might be affected. And if the referenced cell changes, there is no way to determine which other cells will change automatically. The only way to figure out what objects are referencing the referenced object is by watching the system in operation.

If the referenced object is changed, the referencing object might need to change, too. But the unidirectional nature of the references imposes a significant limitation in making this update. For example, in FIG. 1, if file 125 is deleted from folder 110, link 120 remains in folder 105 until someone notices that it points to a non-existent file. Until someone removes link 120, folder 105 continues to look as though file 125 is still accessible. Or, if file 125 is renamed, folder 105 might not reflect the change of name to file 125. Instead, folder 105 displays the name of link 120, which is not affected by the fact that file 125 is renamed.

A need remains for a way to provide for associations between files and folders that addresses these and other problems associated with the prior art.

SUMMARY OF THE INVENTION

In an embodiment, the invention is a method and apparatus for relating objects in a file system. Two objects are selected. A relationship between the objects is defined. A contract object is created, establishing the relationship between the objects. The contract locates the two objects, and the objects locate the contract. The contract can be used to ensure that events occurring with respect to one of the objects are properly reflected (if necessary) in the other object. The contract object can be used in numerous applications, including file systems, relational databases, spreadsheets, etc.

The foregoing and other features, objects, and advantages of the invention will become more readily apparent from the following detailed description, which proceeds with reference to the accompanying drawings.

DETAILED DESCRIPTION OF THE PREFERRED EMBODIMENT

The invention addresses the previously described problems by providing a way for files and collections to each locate the other. An object is a "thing" represented in a computer. There is no limit on what type of "thing" the object is. For example, a file is an object. So is a folder, or a record in a database. A person skilled in the art will recognize other types of objects.

Figure 1:
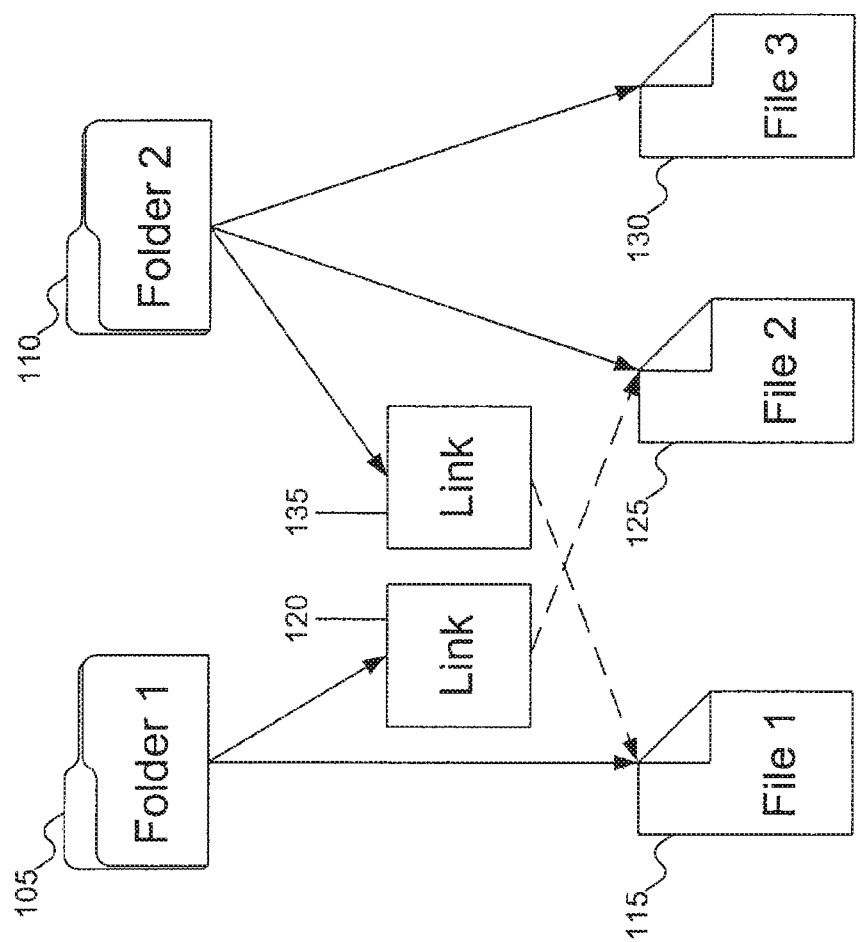
FIG. 1 shows a prior art file system, with folders, files, and uni-directional links from some folders to some files.
Figure 2:
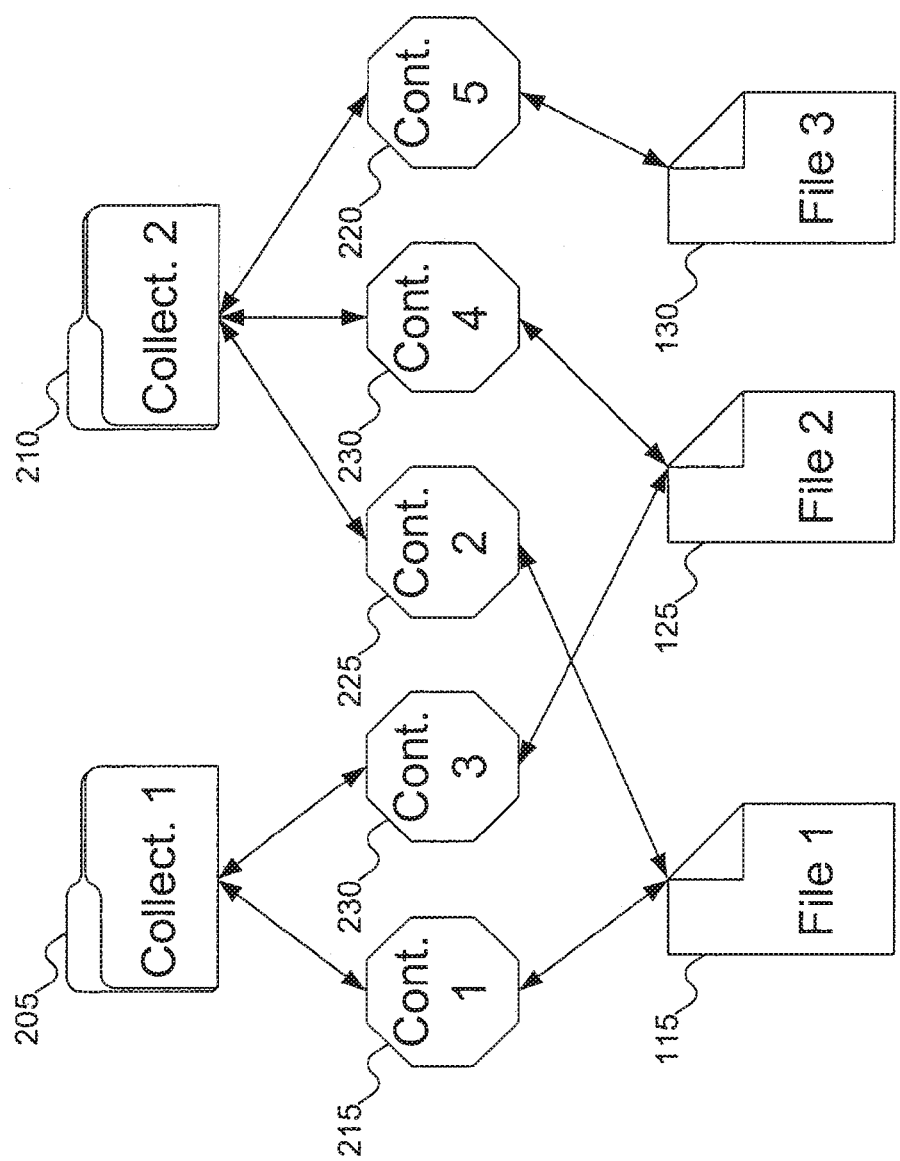
FIG. 2 shows collections, files, and bi-directional contracts, according to an embodiment of the invention.

A collection is a grouping of objects, where the objects can be any type of "thing." For example, as mentioned above, a folder is an object, but a folder is also an example of a collection. But a folder imposes some form of organization on the files in the folder and is thus a narrower concept than a collection, which can be unorganized. FIG. 2 shows an example of how the invention operates using the files of FIG. 1. In FIG. 2, files 115, 125, and 130 are the same; collections 205 and 210 substitute for folders 105 and 115. Rather than storing file 115 in collection 205 and creating a link from collection 210 to file 110, the file and collections are managed separately. New objects, called contracts and represented by contracts 215-220, establish relationships between the files and the collections. For example, contract 215 defines a relationship between collection 205 and file 115, and contract 230 defines a relationship between collection 205 and file 125. These relationships are bi-directional: that is, both the collections and the file can access the contracts with which the folders and files are associated.

In the discussion above and below, the various objects are referred to by their type. In fact, the type of the object is a descriptor for the object, and the objects should be referred to more formally as types of objects. For example, formally a contract should be identified as a contract object. But to avoid repetitious use of the noun "object," the objects will be referred to simply by their type. A person skilled in the art will understand that an object of a particular type is intended when the object type is used.

A person skilled in the art will recognize that although the use of the invention is most immediately apparent for establishing relationships between files and folders, there is no such limitation on the use of contracts. Contracts can be used to establish bi-directional relationships between any object types, of which folders and files are but two examples. Nevertheless, to improve understanding, the remainder of this document will describe contracts as creating relationships between files and collections. In addition, contracts can be used to establish multi-directional relationships between more than two objects, if desired. For example, a single contract can be used to relate a single file with multiple folders, although this construct can be simulated using two or more contracts; each contract relating the file with one folder.

At this point, it should be apparent how the improvement solves the problem of having changes to files be reflected in the correct folders. Because files 115-130 can access contracts 215-220 as appropriate, changes to the files can be reflected in the appropriate collections. For example, if file 115 is renamed, file 115 can access contracts 215 and 225, and collections 205 and 210 can both be updated as needed to reflect the change of name to file 115. Or if file 130 is deleted, contract 220 can be accessed to identify to which collections file 130 belongs (in FIG. 2, file 130 is a member of only collection 210), so that the appropriate collections can be informed that the file has been deleted.

A person skilled in the art will recognize that "contracts" are a special type of object in the file system. For example, contract 215 is created by the file system to represent the relationship between file 115 and collection 205. The contract can be used to represent one part of a many-to-many relationship. Typically, the contract is hidden from users, and is used only by the file system. But a person skilled in the art will recognize that contracts do not have to be hidden: that is, contracts can be made visible, if desired.

Figure 3:
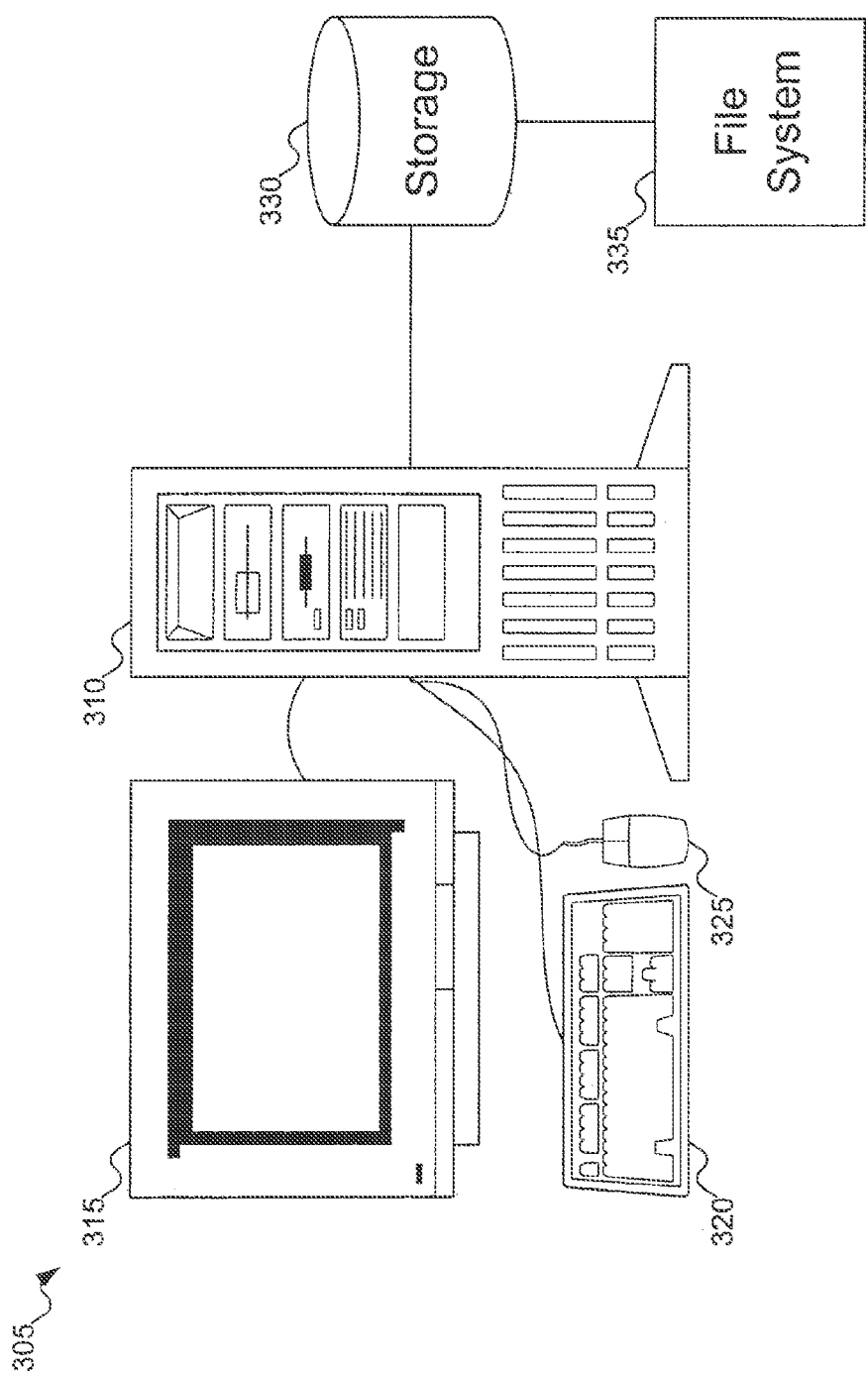
FIG. 3 shows a file system capable of storing the collections, file, and contracts of FIG. 2.

FIG. 3 shows a file system capable of storing the collections, file, and contracts of FIG. 2. In FIG. 3, computer system 305 is shown. Computer system 305 includes computer 310, monitor 315, keyboard 320, and mouse 325. A person skilled in the art will recognize that other components can be included with computer system 305: for example, other input/output devices, such as a printer. In addition, FIG. 3 does not show some of the conventional internal components of computer system 305; for example, a central processing unit, memory, etc. Finally, although computer system 305 is shown standing alone, a person skilled in the art will recognize that computer system 305 can interact with other computer systems, either directly or over a network of any type.

Computer system 305 includes storage 330. Storage 330 is used to store objects. Storage 330 is typically a non-volatile storage, so that the objects stored on storage 330 are not lost if computer system 305 loses power, and that typically storage 330 is some variety of fixed-disk storage, such as a hard drive. But a person skilled in the art will recognize that storage 330 can be other varieties of storage, such as optical storage (possibly re-writable) or non-volatile memory, and that storage 330 can be a volatile storage if computer system 305 is not turned off, is protected against power failure, or if storage 330 can lose its contents when computer system 305 is turned off.

Figure 4A:
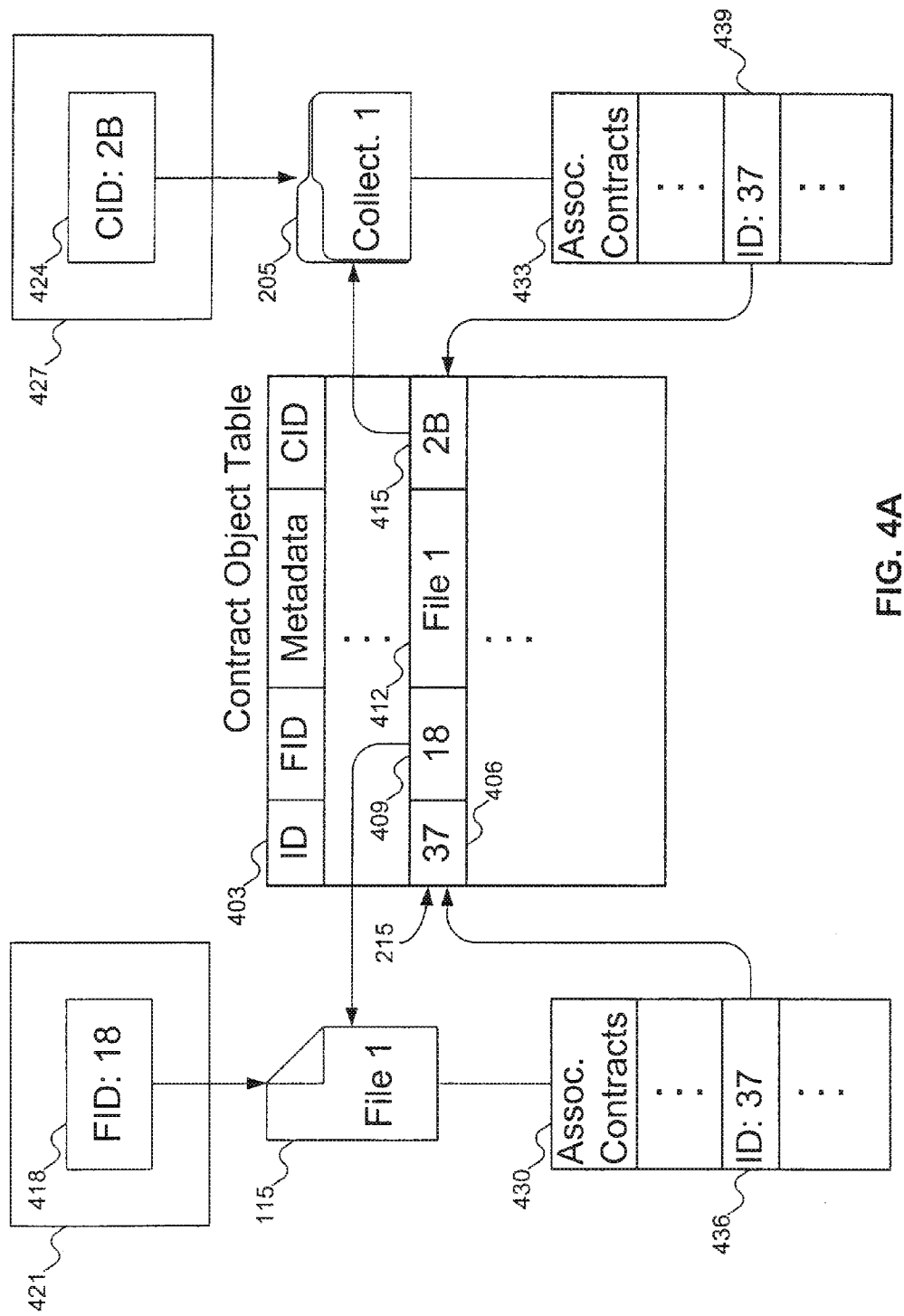
FIGS. 4A-4B show different ways to store a bi-directional contract of FIG. 2 in the file system of FIG. 3.
Figure 4B:
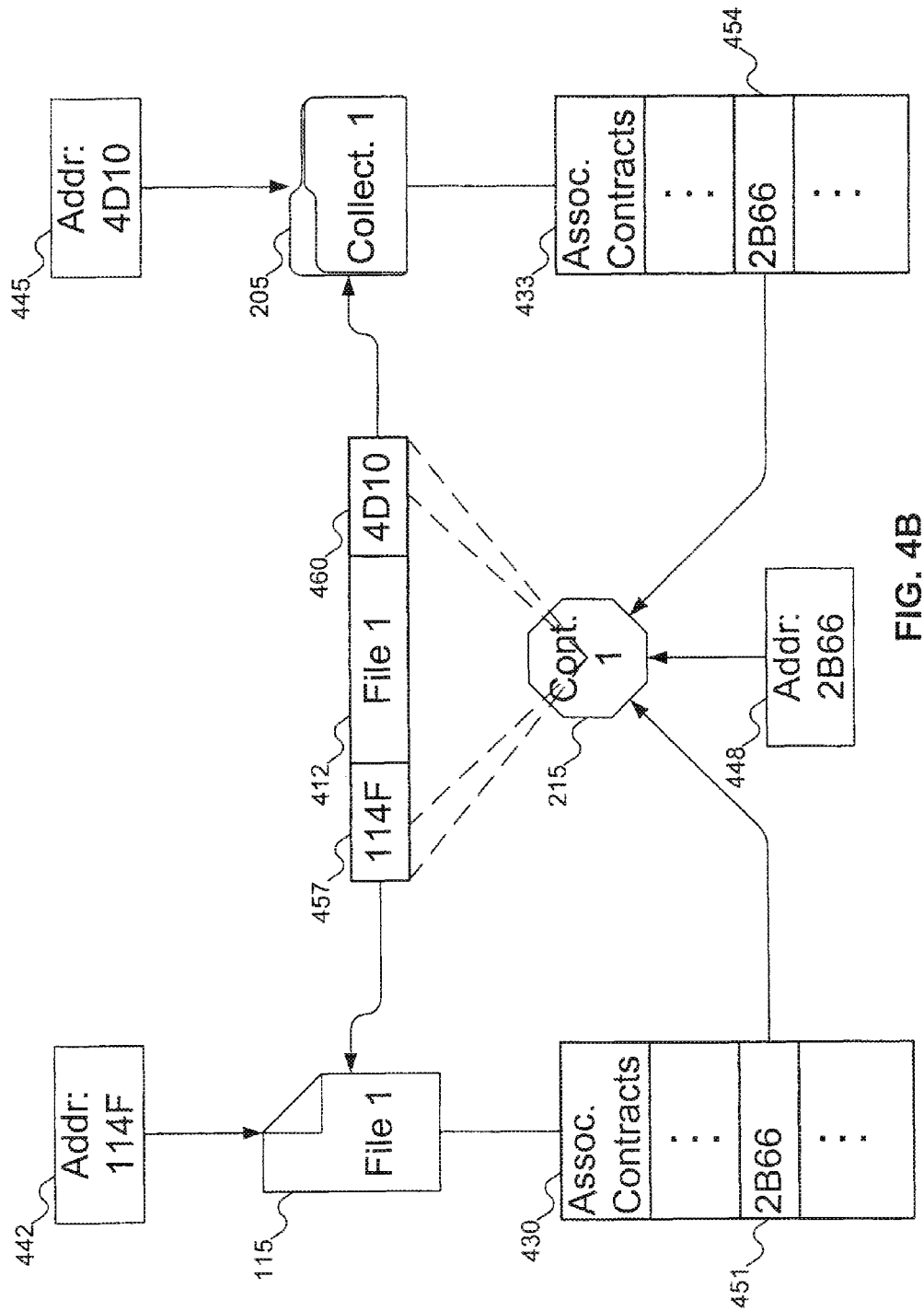

FIGS. 4A-4B show different ways to store the contract of FIG. 2 in the file system of FIG. 3. In FIG. 4A, contract 215 is an entry in contract object table 403. Contract object table 403 is a data structure stored on the storage of the computer system (such as storage 330 of FIG. 3). Contract 215, as shown, includes four fields. These fields are an ID for the contract, a locator for the file object, a metadata for the file object, and a locator for the collection object. For example, contract 215 has an ID of 37 (ID 406), can locate the file with ID 18 (file ID 409) which has metadata storing the name "File 1" (metadata 412), and can locate collection 28 (collection ID 415).

As can be seen in FIG. 4A, file 115 has file ID 18, shown by file identifier 418. Identifier 418 is part of file object table 421, similar to contract object table 403, and maps file identifiers to a location in the storage where the identified file can be found. Similarly, collection 205 has collection ID 2B, shown by collection identifier 424, and collection identifier 424 is part of collection object table 427. Although file object table 421 and collection object table 427 are not shown in detail in FIG. 4A, a person skilled in the art will recognize how they can be constructed.

Both file 115 and collection 205 have a list of associated contracts (respectively, lists 430 and 433). These lists store the contract IDs of contracts that are associated with the objects. Note that both of lists 430 and 433 include contract ID 37 (as entries 436 and 439, respectively), which identifies contract 215. This allows both file 115 and collection 205 to locate contract 215, which establishes the relationship between file 115 and collection 205.

As mentioned above, contract 215 includes metadata 412. Typically, a contract is an object created and used by the file system, without the user having any awareness of the contract's existence. The file system, which operates on binary identifiers, does not have any real use for a human-readable name for file 115, and can manage the objects without storing metadata 412. But metadata 412 can be stored in contract 215 provides a level of redundancy among the objects, to make sure that the contract is identifying the correct file. (Although not shown in FIG. 4A, contract 215 can also include metadata for collection 205, as there is no reason to limit the inclusion in contract 215 of metadata for only one of the objects associated by contract 215.)

In addition, storing metadata about the objects in contract 403 can be useful when one of the objects needs to know metadata about the other object. For example, collection 205 occasionally needs to know the name of file 115 (such as when a user requests the names of all objects in collection 205). Storing the name of file 115 as metadata 412 in contract 215 saves one level of indirection in accessing file 115. If contract 215 does not store metadata 412, then the file system has to access contract 215, and then access file 115 to determine name of file 115.

A person skilled in the art will recognize that metadata 412 is optional. That is, contract 215 loses no functionality by omitting metadata 412. Whether or not metadata 412 is included involves weighing the increased potential efficiency of use (by not needing the extra level of indirection to access the metadata of the object) versus the increased space and management complexity required for contract 215.

Although in FIG. 4A the objects are all located using identifiers (and tables, which map the identifiers to object locations), a person skilled in the art will recognize that other embodiments are possible. For example, instead of using tables and object identifiers, the objects can be located directly using their addresses. This embodiment is reflected in FIG. 4B. In FIG. 4B, file 115, collection 205, and contract 215 all have addresses in storage. File 115 has address 442, collection 205 has address 445, and contract 215 has address 448. File 115 and collection 205, in their lists of associated contracts, store the address of contract 215, as shown by entries 451 and 454, respectively. Similarly, contract 215 stores the addresses of file 115 and collection 205, as shown by file address 457 and collection address 460, respectively. By storing the addresses instead of object IDs, the objects can be located without referring to an object table. But because objects can move in storage, using object addresses has a limitation: if the object moves, anything that refers to the object address also needs to be updated.

Figure 5A:
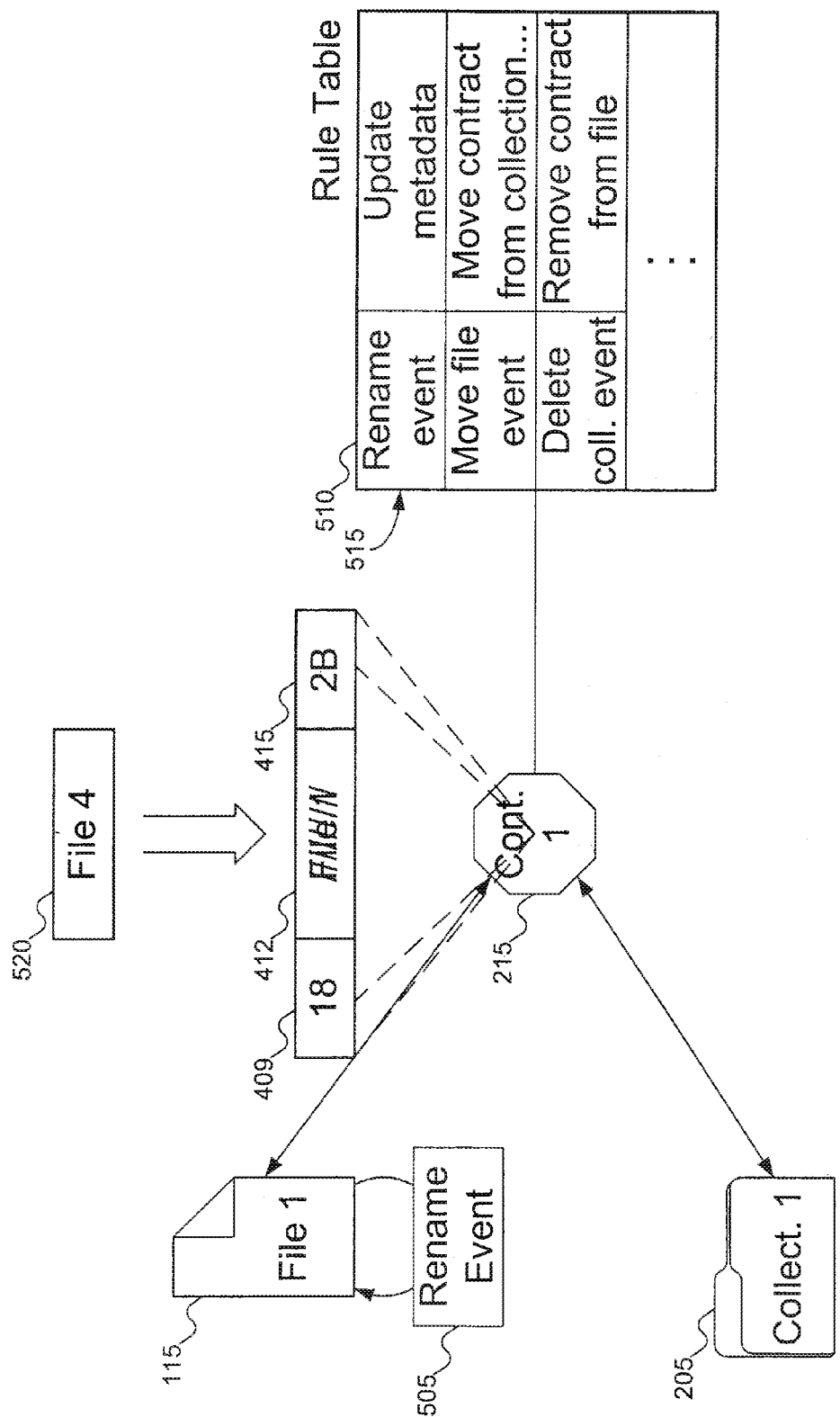
FIGS. 5A-5C show events affecting a contract of FIG. 2, and the application of rules corresponding to the events.
Figure 5B:
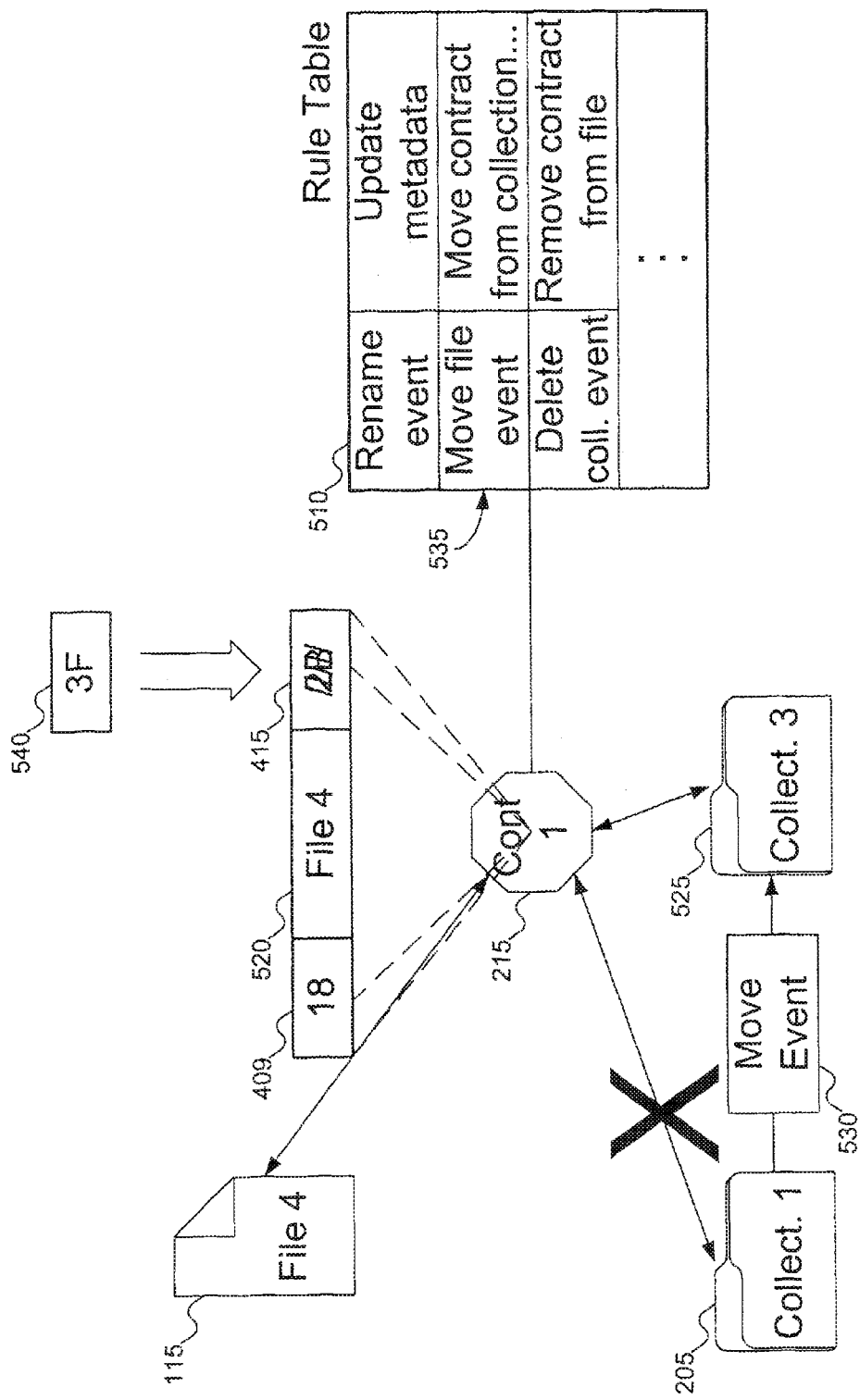
Figure 5C:
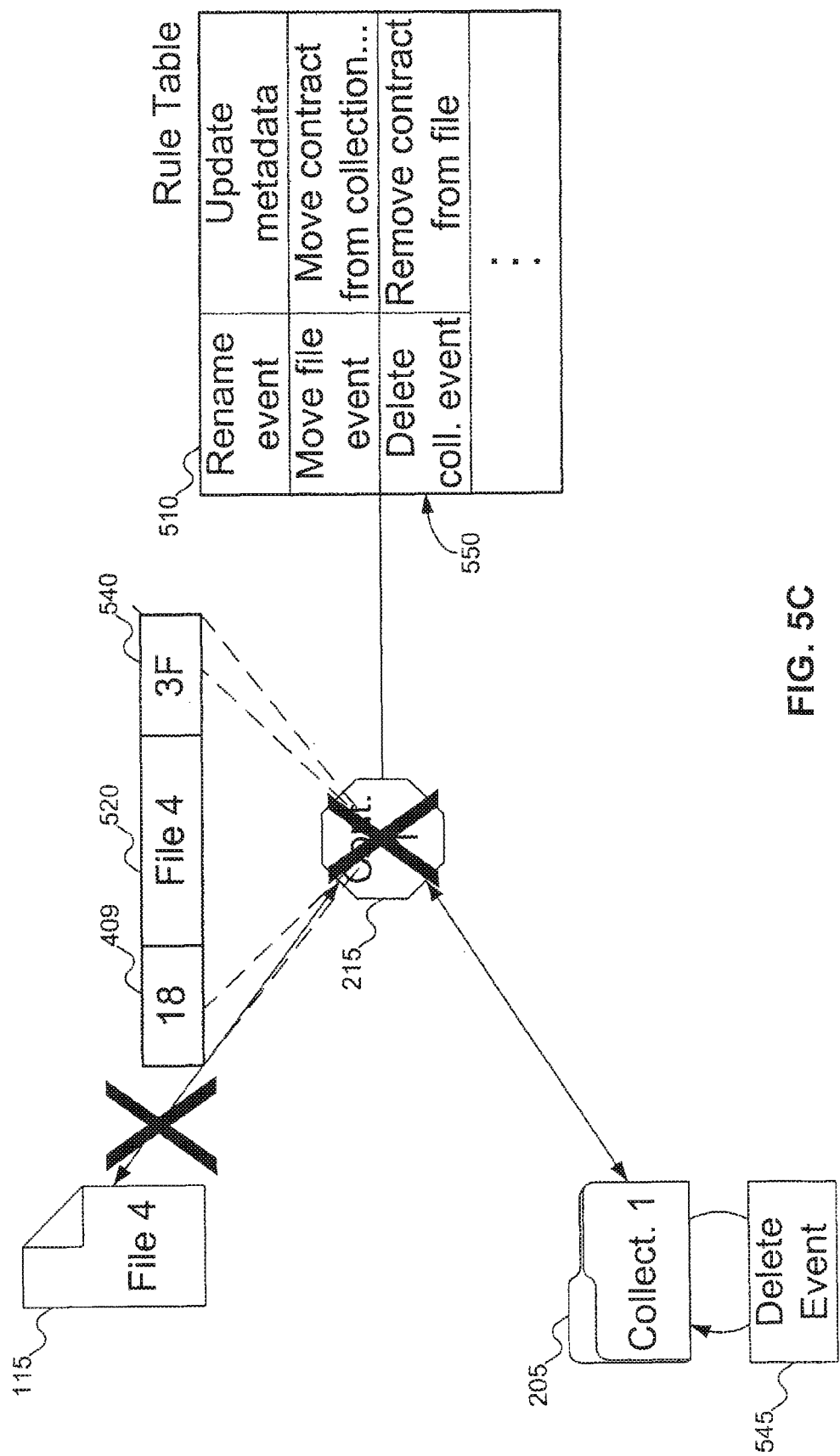

FIGS. 5A-5C show events occurring to a contract of FIG. 2, and the application of rules corresponding to the events. FIG. 5A shows rename event 505 occurring to file 115. When rename event 505 occurs to file 115, the contracts associated with file 115, such as contract 215, are accessed. Contract 215, like all contracts, includes rule table 510. Rule table 510 relates rules to apply to the contract or the objects the contract associates when particular events occur. For example, rule table 510 includes rule 515, which indicates that when a rename event occurs to a file, the metadata stored in the contract is updated. As shown, new metadata 520 replaces old metadata 412 (in FIG. 5A, changing the name of file 115 as stored within contract 215). In addition, file rename event 505 is passed to collection 205, as collection 205 might be affected by file rename event 505. (Collection 205 is notified about all events, not simply file rename event 505: any event might have an impact on a related object.)

As discussed above with reference to FIG. 4A, contract 215 can omit metadata 412. If contract 215 does not include metadata 412, then rule 515 can be omitted (aside from the fact that file rename event 505 is forwarded to collection 205).

In FIG. 5B, the user has chosen to move file 115 from collection 205 to collection 525. This is shown by move event 530. When move event 530 occurs, contract 215 accesses rule table 510, and finds rule 535, which says that when a file is moved from one collection to another, the contract changes the collection with which the contract is associated. New contract ID 540 replaces old contract ID 415, which changes the collection with which contract 215 is associated from collection 205 to collection 525. Then contract 215 is removed from the associated contracts list of collection 205, and added to the associated contracts list of collection 525. At this point, the rule has been fully applied.

In FIG. 5C, collection 205 is being deleted, as shown by delete event 545. Again, contract 215 checks rule table 510, and finds rule 550. To apply rule 550, contract 215 is removed from the associated contracts list of file 115. Then, contract 215 itself is removed (since one of the objects related by contract 215 no longer exists).

As discussed above with reference to FIG. 2, contracts are usually hidden by the file system, so that users cannot see the contracts. As such, the rules and events that apply to contracts are usually consistent across contracts relating particular object types (although a contract that relates a file to a collection might have different rules and events than a contract relating two other, unrelated object types). That is, all contracts that relate a file with a collection typically have the same rules and events. But a person skilled in the art will recognize that contracts can be assigned customized rules and events, specific to an individual contract. Further, the customized rules and events can be assigned by the file system, or by anything that can use the contract (e.g., a user or a program running on the computer system).

Although FIGS. 5A-5C show individual rules being applied to a single contract, a person skilled in the art will recognize that rules can be applied in other ways. For example, typically, all the contracts associated with an individual object are checked to see if any rules apply to the contract given the event. Similarly, there can be more than one rule to apply to a given contract for a single event. Finally, the rules to be applied to one contract can differ from the rules applied to another contract, even given the same event.

FIGS. 5A-5C describe three possible events that can affect a contract; namely, object renaming, object movement, and object deletion. A person skilled in the art will recognize that other events can affect a contract. For example, it can occur that the changing of data in an object can affect the contract. One event that typically does not have an associated rule is object creation. Since a contract cannot represent the relationship between two objects if one of the objects does not yet exist, object creation is not an event that typically has an associated rule in a contract. But if a contract can exist before at least one of the objects related by the contract exists, then object creation can be an event with an associated rule in the contract.

Figure 6:
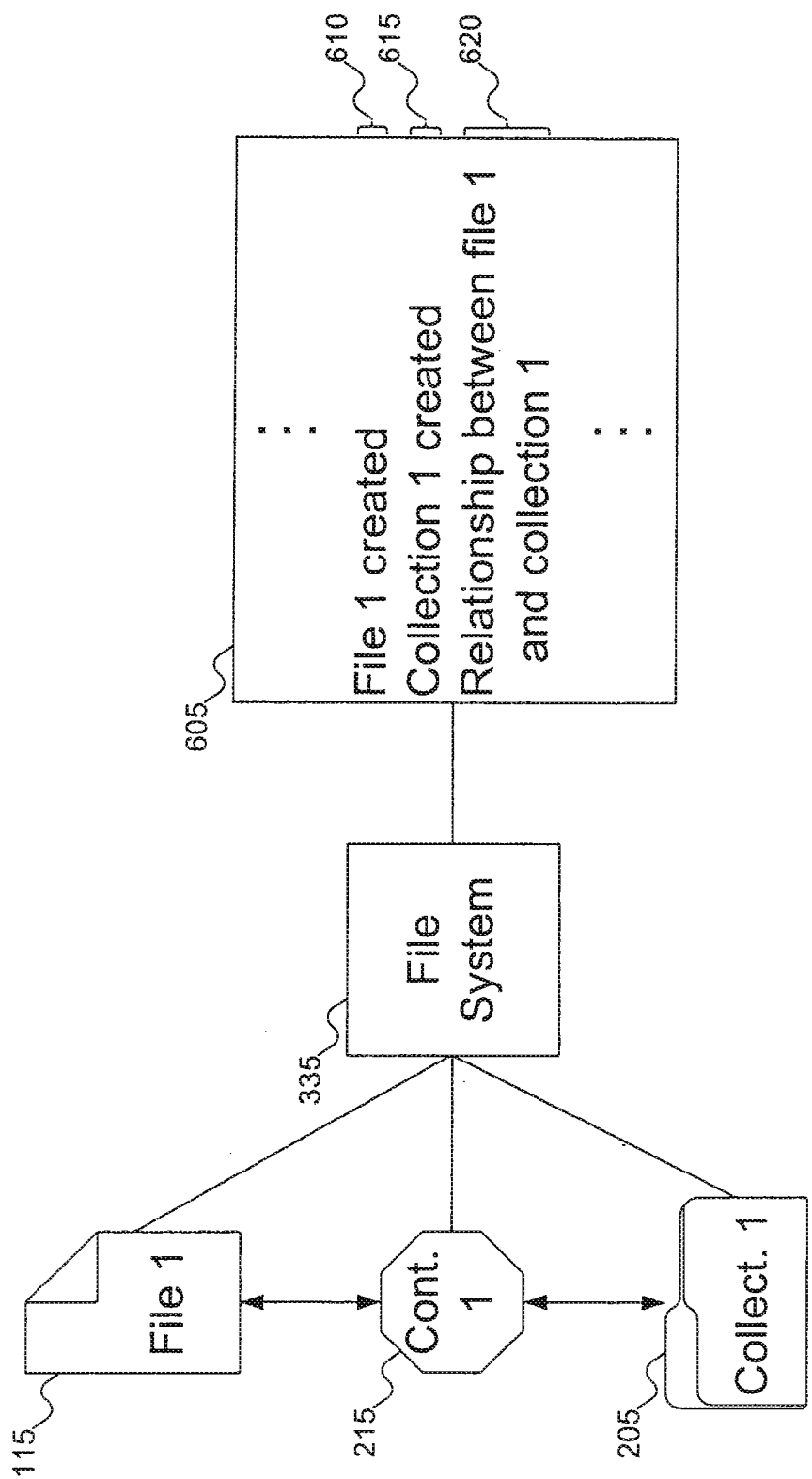
FIG. 6 shows a transaction log recording object manipulations in a file system.

FIG. 6 shows a transaction log recording object manipulations in the file system. In FIG. 6, the user created file 115 and collection 205. The user then defined a relationship between file 115 and collection 205, represented by contract 215. All of these objects are part of file system 335. File system 335 also keeps transaction log 605. Transaction log 605 stores entries. Each entry in transaction log 605 represents one transaction that has occurred in file system 335. For example, entry 610 represents the creation of file 115, and entry 615 represents the creation of collection 205.

Entry 620 represents the user indicating that there is a relationship between file 115 and 205. As discussed above, when the user indicates that there is a relationship between two objects in file system 335, that relationship is represented by a contract. Thus, entry 620 represents the user's request that a contract object be created, relating file 115 and collection 205. Once contract 215 is completely created, a new entry can be added to transaction log 605, indicating that contract 215 has been completely created.

Transaction log 605 can serve many different purposes. One purpose for transaction log 605 is to track every major manipulation of file system 335. In this case, transaction log 605 stores a record of every object manipulation (among other things stored by transaction log), and entries remain in transaction log 605 until an authorized user (e.g., a system administrator) removes the entries. Another use for transaction log 605 is to enable the rebuilding of file system 335 in case the file system is damaged before it reaches a stable state. For example, if power were to fail to the computer containing file system 335, then transaction log 605 can be used to rebuild the file system, completing object manipulations that were underway at the time the power was lost. In this case, transaction log 605 might not include all the entries shown in FIG. 6. For example, transaction log 605 might not include entry 610, representing the creation of file 115, if file 115 can be created in an (effectively) atomic operation. Or, the entry might be removed after the object manipulation is finished, and file system 335 is once again in a stable state. For example, once collection 205 is completely created, entry 615 can be removed from transaction log 605, as there is no need to recreate collection 205.

If transaction log 605 is used to rebuild file system 335, then when file system 335 can begin to recover from the failure, file system 335 accesses transaction log 605 and determines which transactions were underway when the failure occurred. Entry 620 can be used to retry creating contract 215, completing the relationship between file 115 and collection 205. Once contract 215 is established, entry 620 can be removed from transaction log 605. If entry 620 were the only entry in transaction log 605, then file system 335 would know that file system 335 is fully restored, and normal file system operations can commence.

Figure 7A:
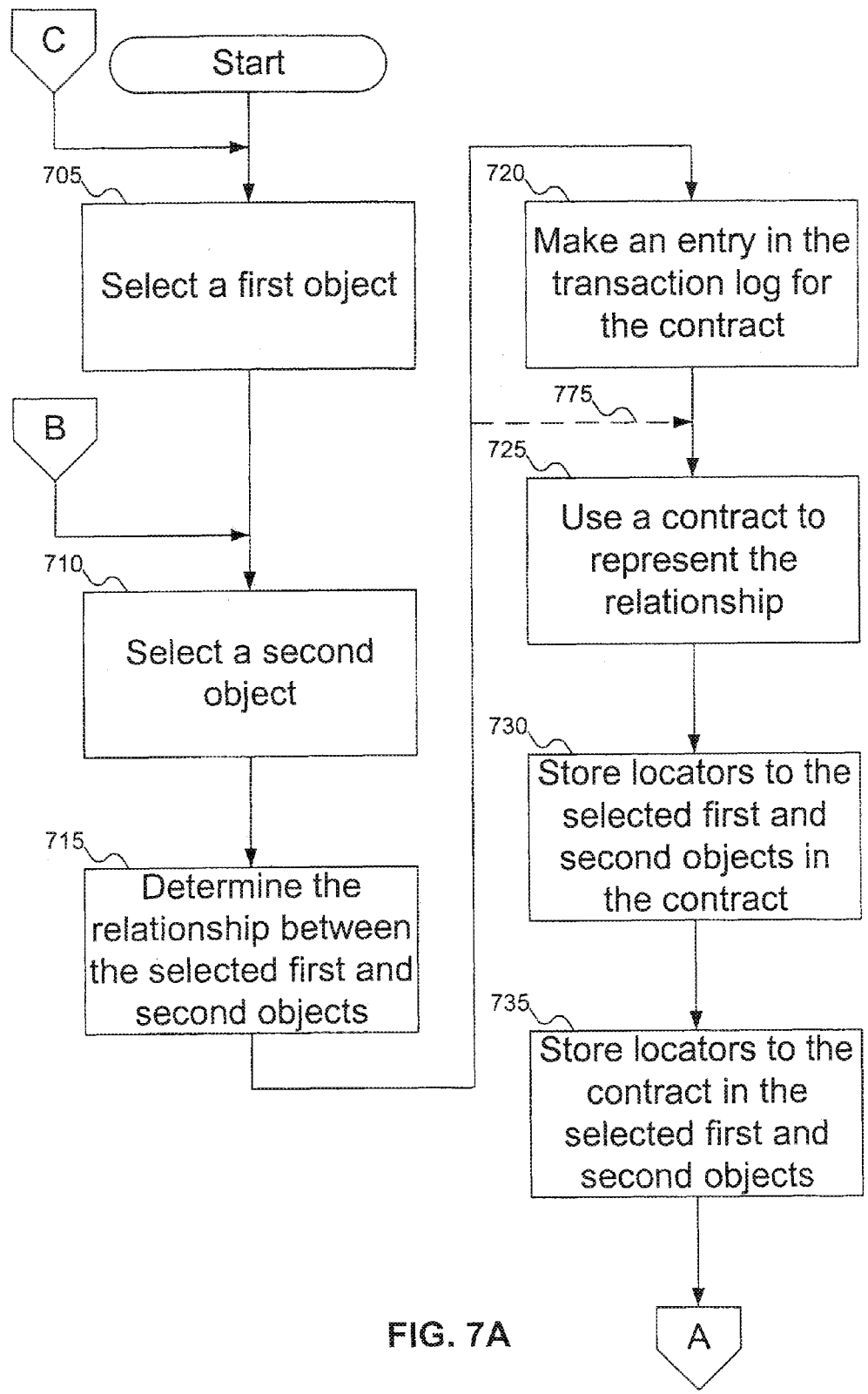
FIGS. 7A-7B show a flowchart of the procedure for using contract objects in the file system of FIG. 3.
Figure 7B:
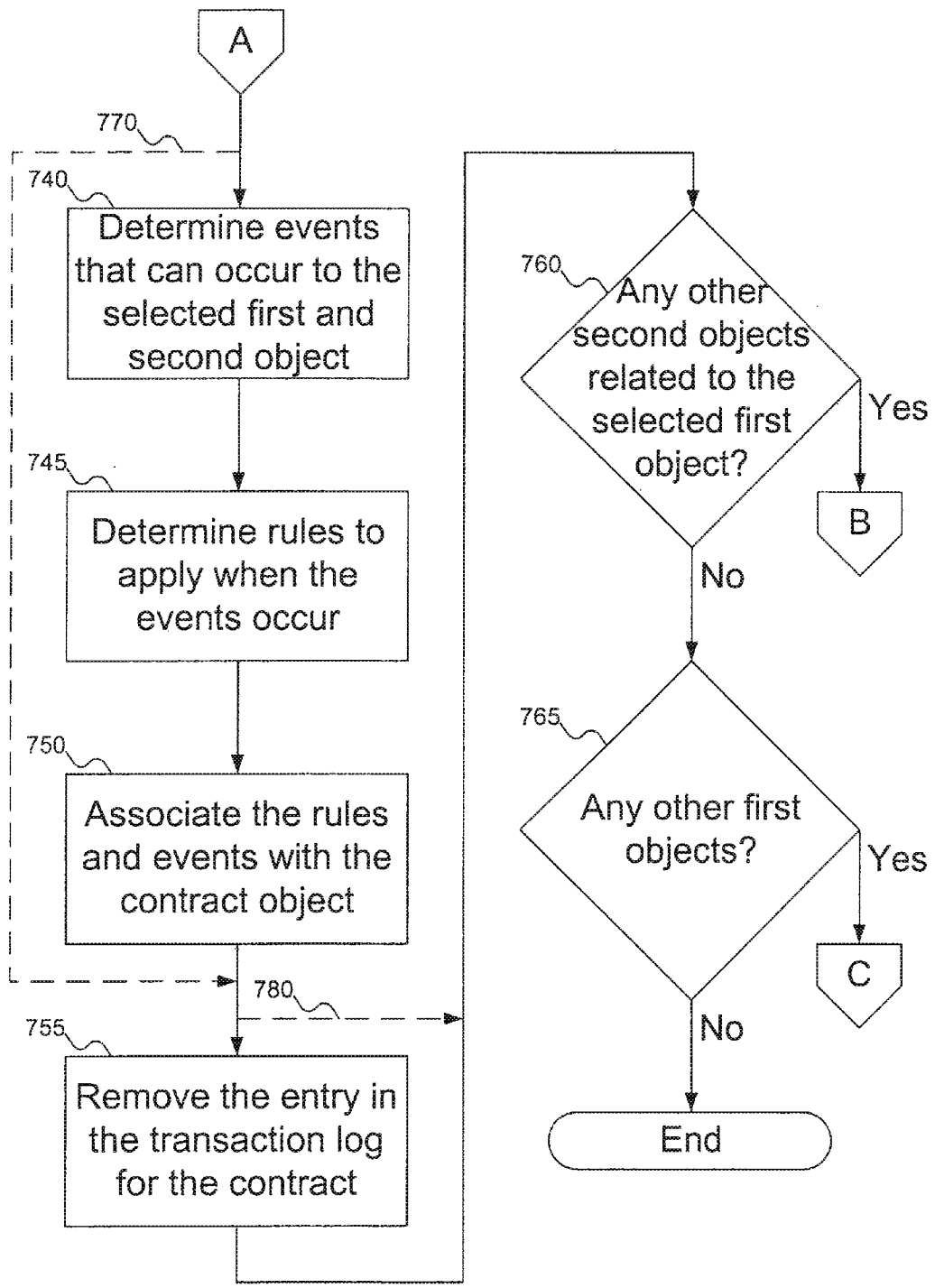

FIGS. 7A-7B show a flowchart of the procedure for using contract objects in the file system of FIG. 3. In FIG. 7A, at step 705 a first object is selected. In the file/collection model, the first objects identified can be either the files or the collections: the procedure operates the same in either case. And, as discussed above with reference to FIG. 2, contracts can relate any object types, not simply files and collections. At step 710, a second object is selected. Again, in the file/collection model, the second objects can be either the files or the collections. At step 715, the relationship between the selected first and second objects is determined. At step 720, the transaction log is updated to have an entry reflecting the contract creation. At step 725, the relationship is represented using a contract object. At step 730, locators locating the selected first and second objects are stored in the contract, and at step 735 a locator for the contract is stored in the selected first and second objects.

At step 740 (FIG. 7B), events that can occur to the selected first and second objects are determined. At step 745, the rules to be applied when the events occur are determined, and at step 750, the rules and events are associated with the contract. Finally, at step 755 the transaction log is updated to remove the entry reflecting the contract creation.

At step 760, the system checks to see if there are any other second objects that need to be related to the selected first object. If there is another second object to be related to the selected first object, then processing returns to step 710 to select another second object. Otherwise, at step 765, the system checks to see if there are any remaining first objects to process. If there is another first object to process, then processing returns to step 705 to select another first object. Otherwise, the procedure is complete.

A person skilled in the art will recognize that it can happen that there are no events/rules of relevance for a contract object. In that case, as shown by line 770 (FIG. 7B), steps 740-750 can be omitted. Similarly, if the transaction log is not used, then steps 720 and 755 can be skipped, as reflected by lines 775 (FIG. 7A) and 780 (FIG. 7B), respectively. In addition, a person skilled in the art will recognize that, although the transaction log can be used to rebuild the file system in case of a failure, the transaction log can be a history of transactions on the file system. In that case, entries from the transaction log are not removed automatically, but only by an authorized user (e.g., a system administrator), and so step 755 can be skipped, as reflected by line 780 (FIG. 7B). The transaction log can still be used to rebuild the system in this case, but the file system then has to check whether the objects in question exist in the file system before performing the steps in the transaction log.

Figure 8:
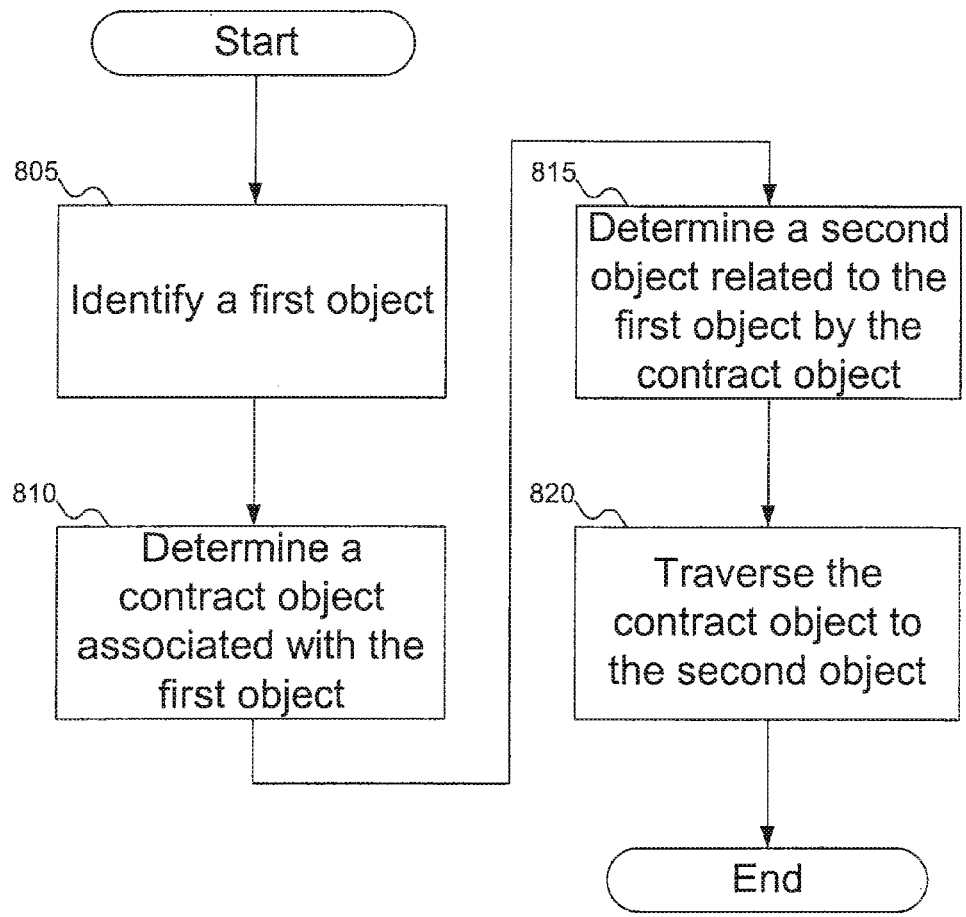
FIG. 8 shows a flowchart of the procedure for using a contract to determine related objects in the file system of FIG. 3.

FIG. 8 shows a flowchart of the procedure for using a contract to determine related objects in the file system of FIG. 3. In FIG. 8, at step 805, the file system identifies a first object. In the collection/file model, this first object can be either the collection or the file. At step 810, the file system determines a contract associated with the first object. At step 815, the file system determines a second object related to the first object via the contract. Finally, at step 820, the file system traverses to the second object via the contract object.

Figure 9:
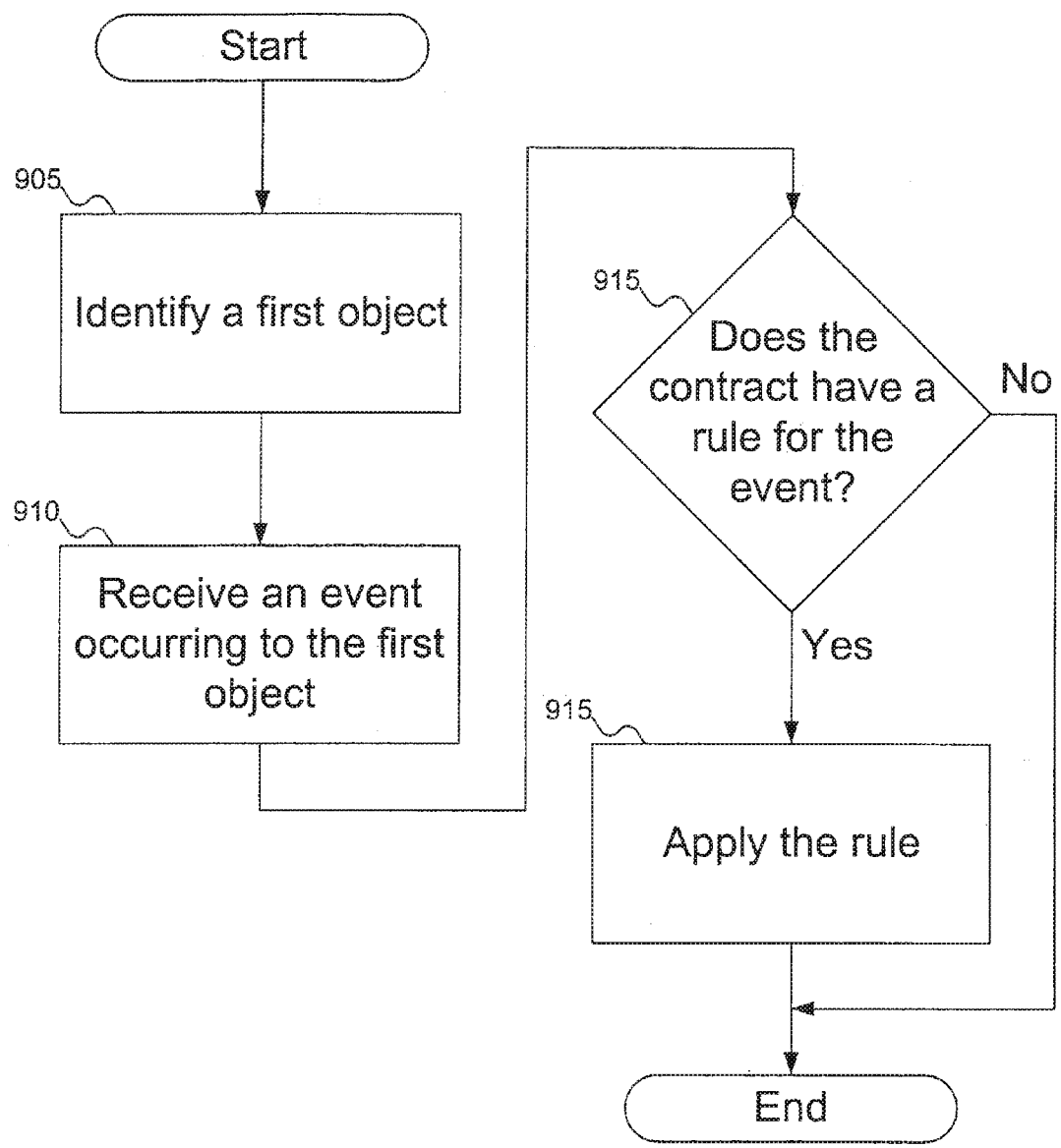
FIG. 9 shows a flowchart of the procedure for applying rules to a contract object in the file system of FIG. 3 responsive to an event.

FIG. 9 shows a flowchart of the procedure for applying rules to a contract object in the file system of FIG. 3 responsive to an event. In FIG. 9, at step 905, the file system identifies a first object. In the collection/file model, this first object can be either the collection or the file. At step 910, the file system receives an event occurring to the first object. At step 915, the file system determines whether the contract has a rule for the event. If so, then at step 920 the file system applies the rule. As discussed above with reference to FIGS. 5A-5C, the rule can be applied to the contract, to the object on which the event is occurring, or on the second object to which the first object is related by the contract.

Figure 10A:
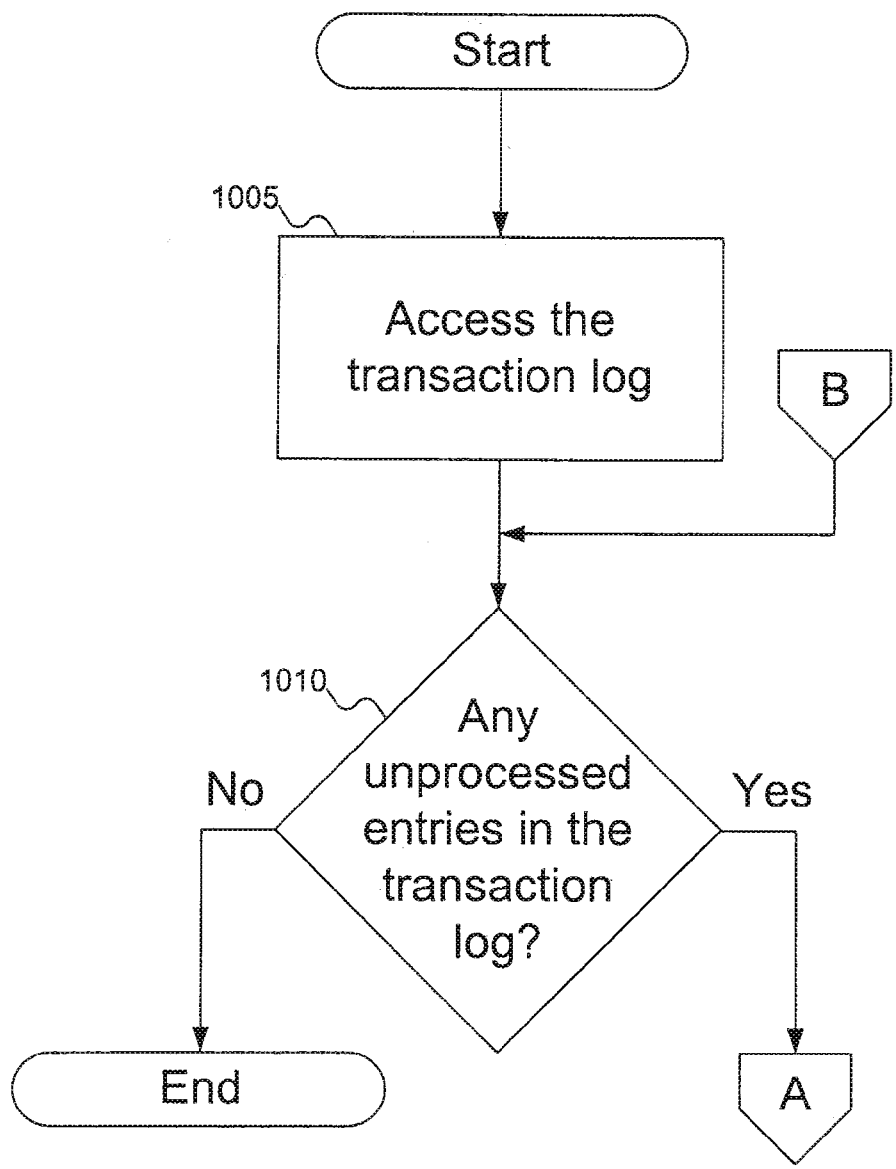
FIGS. 10A-10B show a flowchart of the procedure for using a transaction log to rebuild the file system of FIG. 3.
Figure 10B:
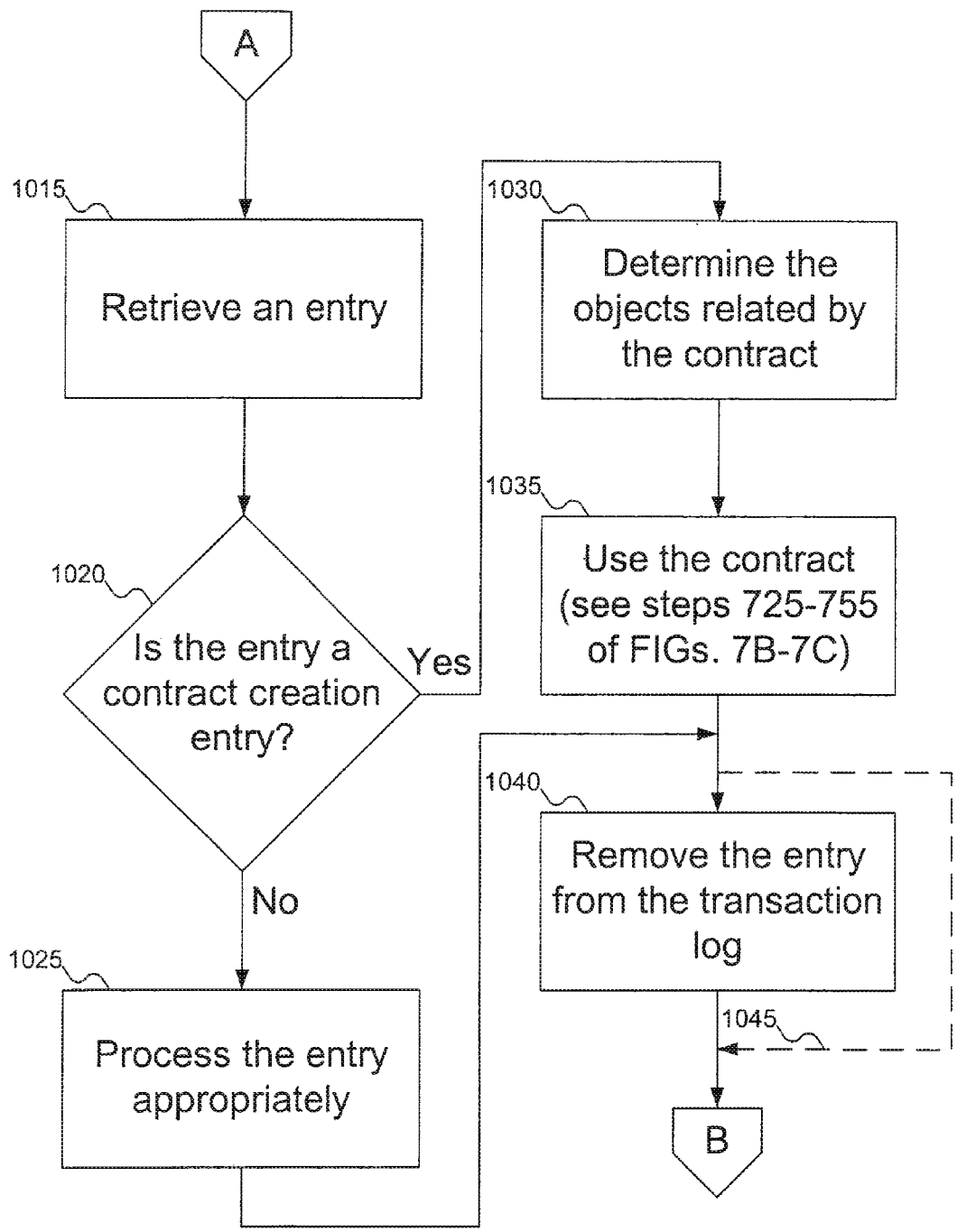

FIGS. 10A-10B show a flowchart of the procedure for using a transaction log to rebuild the file system of FIG. 3. In FIG. 10A, at step 1005, the file system accesses the transaction log. At step 1010, the file system determines if there are any unprocessed entries in the transaction log. If all entries in the transaction log have been processed, then the file system is rebuilt and the procedure ends.

If there are any unprocessed entries in the transaction log, then at step 1015 (FIG. 10B) the file system retrieves an entry from the transaction log. At step 1020, the file system determines the type of object affected by the entry. If the entry affects an object other than a contract, then at step 1025 the file system processes the entry to complete the transaction. Since the only objects requiring special processing in FIGS. 10A-10B are contract objects, no further detail is provided explaining the processing of other object types. At step 1030, assuming the event affects a contract, the objects related by the contract are determined. At step 1035, the contract is used to represent the relationship between the objects, as shown in steps 725-755 of FIGS. 7A-7B. Finally, at step 1040, the entry is removed from the transaction log. Processing then returns to step 1010 of FIG. 10A.

As discussed above with reference to FIG. 6, the transaction log can store all transactions, not only the transactions needed to bring the file system to a stable state. In that case, step 1040 can be skipped, as shown by line 1045.

A person skilled in the art will recognize that an embodiment of the invention described above can be implemented using a computer. In that case, the method is embodied as instructions that make up a program. The program may be stored on computer-readable media, such as floppy disks, optical discs (such as compact discs), or fixed disks (such as hard drives), and can be resident in memory, such as random access memory (RAM), read-only memory (ROM), firmware, or flash RAM memory. The program as software can then be executed on a computer to implement the method. The program, or portions of its execution, can be distributed over multiple computers in a network.

Having illustrated and described the principles of the invention in a preferred embodiment thereof, it should be readily apparent to those skilled in the art that the invention can be modified in arrangement and detail without departing from such principles. All modifications coming within the spirit and scope of the accompanying claims are claimed.

The invention claimed is:

1. A computer-implemented method for using a file system, comprising:
   a first storage storing a first file object in the file system;
   a first storage storing a first collection object in the file system;
   a second storage storing a contract object table and a first contract in the contract object table, the first contract representing a relationship between the first file object and the first collection object, the second storage storing a second contract in the contract object table, the second contract representing a relationship between a second file object in the file system and the first collection object;
   a third storage storing a rule table and a first rule in the rule table, the third storage storing a second rule in the rule table;
   a computer receiving a first event associated with the first file object, the first collection object, or both;
   the computer selecting the first contract in the contract object table responsive to the receiving;
   the computer selecting the first rule in the rule table responsive to the receiving and based at least in part on the first contract;
   the computer applying the first rule to the first file object, the first collection object, or the first contract;
   the computer determining that a second event has occurred to the second file object, the first collection object, or both;
   the computer selecting the second contract in the contract object table responsive to the determining;
   the computer selecting the second rule in the rule table responsive to the determining and based at least in part on the second contract; and
   the computer applying the second rule to at least one of a group consisting of: the second file object, the first collection object, and the second contract.

2. A computer-implemented method according to claim 1, wherein the first contract comprises a first contract identifier, a locator for the first file object, metadata for the first file object, and a locator for the first collection object.

3. A computer-implemented method according to claim 1, wherein a single device comprises at least two of a group consisting of: the first storage, the second storage, and the third storage.

4. A computer-implemented method according to claim 1, further comprising the second storage storing a second contract in the contract object table, the second contract representing a relationship between the first file object and a second collection object in the file system.

5. A computer-implemented method according to claim 4, further comprising the third storage storing a second rule in the rule table.

6. A computer-implemented method according to claim 5, further comprising:
   the computer determining that a second event has occurred to the first file object, the second collection object, or both;
   the computer selecting the second contract in the contract object table responsive to the computer determining;
   the computer selecting the second rule in the rule table responsive to the computer determining and based at least in part on the second contract; and
   the computer applying the second rule to at least one of a group consisting of: the first file object, the second collection object, and the second contract.

* * * * *